Jan. 22, 1952   H. W. PATNODE   2,583,276
METHOD OF DETERMINING FORMATION FACTOR OF IRREGULAR ROCK SAMPLES
Filed April 20, 1950
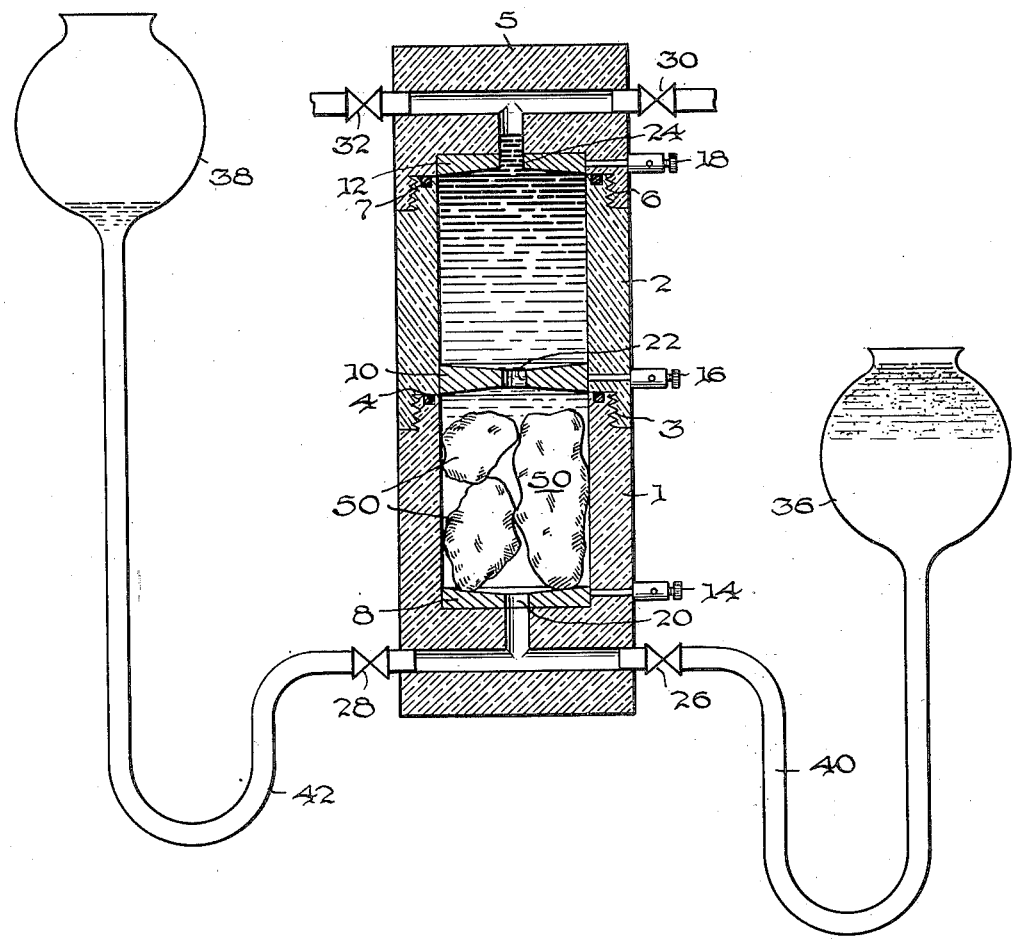
INVENTOR.
HOMER W. PATNODE
BY
his ATTORNEY Patented Jan. 22, 1952

2,583,276

UNITED STATES PATENT OFFICE 2,583,276

METHOD OF DETERMINING FORMATION FACTOR OF IRREGULAR ROCK SAMPLES

Homer W. Patnode, Hampton Township, Allegheny County, Pa., assignor to Gulf Research & Development Company, Pittsburgh, Pa., a corporation of Delaware Application April 20, 1950, Serial No. 157,124

6 Claims. (Cl. 175—183)

This invention has to do with improvements in the electric well-logging art and in particular concerns a method and apparatus for determining at the surface of the ground a factor or parameter of the earth formations penetrated by a borehole during the process of drilling.

Certain aspects of this invention are disclosed and claimed in a copending application Serial No. 157,154, filed of even date herewith by Wyllie and Hogg entitled "Method and Apparatus for Determining a Parameter of Earth Formations Penetrated by a Borehole" and assigned to the same assignee as the present application.

Electrical-resistivity well logs are well known. Common practice is to drill the well for a distance, and before setting casing in an interval making one or more electrical logs of the formations penetrated in this interval. In the subsequent interpretation of these electric logs, various assumptions are customarily made because of the lack of complete theoretical adequacy of the usual logging measurements. Certain factors have been found very useful in the interpretation of the well logs, e. g., mud resistivity, self-potential values etc.

One factor which has been found useful in interpreting electric logs is commonly called the "formation factor." Reference to this parameter is made in a publication by G. E. Archie entitled "The electrical resistivity log as an aid in determining reservoir characteristics" in Trans. A. I. M. E. (1942), vol. 146, pp. 54–62. The formation factor is defined as the resistivity of a 100 per cent fluid-saturated rock divided by the resistivity of the saturating fluid. It is implicit in this definition that the porous rock matrix is itself an insulator or substantially so as compared to the conductance of the fluid saturating the interstices of the rock matrix. The formation factor has heretofore been determined by measuring the resistance of a porous medium of known geometry, generally a right cylinder, computing the resistivity from the length and area of the cylinder and dividing this resistivity by the resistivity of the fluid used to saturate the porous medium. The saturating fluid is usually a brine such as is normally found in the rock, but an electrically-conductive liquid which wets and penetrates the porous matrix may be used.

The value of the formation-factor measurement lies in the fact that the product of the formation factor of a rock body and the resistivity of the fluid which saturates that body gives the resistivity of the rock body as it exists in the ground. Hence a comparison between such a computed rock-body, i. e., formation, resistivity with the value of the resistivity of the same formation in situ read from a conventional electrical-resistivity log, will indicate the formation to be either water bearing if the two values are sensibly the same, or oil bearing if the computed resistivity is much less than the resistivity read from the log.

My invention provides a method and apparatus for measuring the formation factor of the rock formations penetrated by a borehole. According to the principle set forth in the above-mentioned copending application of Wyllie and Hogg, the formation factor may be expressed as the resistance of a saturated rock sample divided by the resistance of a volume of fluid having the same shape, size and orientation of the rock sample and this factor may be measured as the resistance of a 100 per cent saturated medium divided by the resistance of the displaced fluid when the medium is immersed therein, it being understood that the two resistances are measured under the same geometrical conditions of container, electrodes, etc.

The principle that the formation factor may be measured by the ratio of the resistance of the saturated porous medium to the resistance of the displaced fluid leads to the conclusion that it can be measured without any limitation on the geometry of the porous medium. This independence of geometry means that more than one fragment can be used if a single irregular sample is too small to be handled conveniently. Accordingly, a rock sample comprising a large number of small fragments such as drill cuttings may be used in making a determination of formation factor. These conclusions have been set forth by Wyllie and Hogg in their above-mentioned copending application.

A simple example may serve to point out the advantage of the invention. The formation factor may be determined in heretofore known manner if one has available a core of known geometry. In practice, a core in the form of a right circular cylinder has usually been obtained from the formation to be studied if the formation factor is to be determined by prior-art laboratory methods. It is very expensive to obtain such a core. If the cylinder should be broken into irregular fragments, the heretofore known methods are of no avail. However, by employing the method and apparatus of my invention, a determination of the formation factor is still possible. In practice, the formation "core" as fragmented by the drill bit during drilling is strained from the drilling mud on the shale shaker screen as a matter of routine since the drill cuttings are always removed from the drilling fluid before the latter may be recirculated. These rock fragments may be used to determine the formation factor of the rock, and the resulting value will be the same value as that which would be measured on the vastly more expensive cylindrical core. It is, of course, assumed that the short section of rock formation being studied is substantially uniform.

A particular advantage of the invention lies in the fact that no core need be taken and no special equipment need be lowered into the borehole. In the invention, use is made of the drill cuttings obtained in the course of drilling the borehole, the depth of the source formation of the cuttings being determined by methods well known in the art. The cost of carrying out the method of the invention is therefore very low since it involves no extra operations on the borehole, the drill cuttings being obtained as a natural consequence of drilling the same. Furthermore, since cuttings are always obtained during drilling, the invention may be substantially continuously carried out while the well is being drilled, thus requiring no interruption in the drilling operation. In addition, it will be seen that the apparatus used in carrying out the invention is inexpensive and simple, and requires no special skill to operate.

It is an object of this invention to provide a method and apparatus for measuring a parameter of an earth formation penetrated by a borehole.

Another object of this invention is to provide a method and apparatus for measuring a parameter of the earth formations penetrated by a borehole which does not require any special electrical or other equipment to be run into the borehole.

Another object of this invention is to provide a method and apparatus for measuring a parameter of the earth formations penetrated by a borehole which does not require cores to be obtained.

Another object of this invention is to provide a method and apparatus for measuring a parameter of an earth formation penetrated by a borehole by making electrical measurements on cuttings obtained in drilling through the formation.

Another object of this invention is to provide a method and apparatus for measuring a parameter of a porous medium by making electrical measurements on one or more irregularly-shaped samples of the formation.

Another object of this invention is to provide a method and apparatus for determining the formation factor of a rock formation by making electrical measurements on one or more irregularly-shaped or fragmented samples of the formation.

These and other objects are attained by my invention as described in the following specification of which the accompanying drawing forms a part.

The drawing shows a schematic diagram of one form of apparatus by means of which my invention may be carried out.

In the above-mentioned copending application by Wyllie and Hogg there is disclosed and claimed a method of measuring the formation factor of one or more fragments of a porous medium by measuring (1) the resistance of an electrolytic cell filled with a sample of the liquid which saturates the fragments, (2) the resistance of the cell filled with the fragments and with the voids between fragments filled with the saturating liquid, and (3) the resistance of the cell filled with the fragments now insulated to prevent passage of electric current therethrough and with the voids between fragments filled with the saturating liquid.

While the above method is theoretically sound in its application to determining formation factor and is entirely feasible for many rock formations, a difficulty arises when unusually large values of formation factor are encountered as is the case with very tight or almost non-porous materials. In this case the measured resistance values in (2) and (3) above are so nearly alike that a substantial error may arise in the computed difference between them, and this difference is necessarily computed in determining the formation factor value from the above-described measurements. It is the particular object of my invention to reduce such error by an improved method employing certain special liquids in making the necessary electrical measurements, all as hereinafter described. This reduction in error is accomplished by avoiding the necessity of insulating the particles and by employing dispersions, i. e., emulsions and/or suspensions whose continuous or non-dispersed phase is the same as the saturating liquid used in the above-mentioned measurement (1), but whose effective resistivity has been adjusted by the introduction of either a highly-conducting or highly-insulating dispersed phase in order to make further electrical resistance measurements which differ substantially and thus permit of obtaining an accurate difference value.

The accompanying drawing illustrates a convenient form of apparatus by means of which the required resistance measurements are conveniently made. The apparatus comprises a lower tube or cell 1 of insulating material such as Lucite or other plastic and preferably transparent. Attached to cell 1 is an upper cell 2 of similar material, the cells being joined as by means of threads 3 and the joint sealed as by means of O-ring gasket 4. The top of cell 2 is closed by a cover 5 also of similar material and joined to cell 2 as by means of threads 6 and the joint sealed as by means of O-ring gasket 7. Each of the units 1, 2 and 5 have annular metal electrodes 8, 10 and 12, respectively, these being conveniently molded or fabricated to be integral with the Lucite or other material of which the units 1, 2 and 5 are made. The electrodes each have tapered upper and lower surfaces in order to avoid trapping air and to facilitate cleaning. The electrical terminals 14, 16 and 18 extend through the wall of the respective units so that electrical connections may be made to the electrodes from outside the assembled apparatus.

The units are preferably dimensioned so that the two chambers defined by cells 1 and 2 are identical in size and shape so that they have the same electrical resistance when filled with the same liquid, although this is not essential and slight corrections may be made for cell differences. Each of the electrodes 8, 10 and 12 has a central opening 20, 22 and 24, respectively, to permit flow of liquid therethrough. These openings should be small enough so that sample fragments will not pass through the opening. Alternatively there may be several small openings in each electrode or a screen covering may be provided to retain such particles.

The bottom of lower unit 1 and the cover 5 are each provided with a bifurcated opening, each opening being controlled through a stopcock as shown at 26, 28, 30 and 32. Each of the openings 26 and 28 in the lower cell may be connected to a burette or leveling bulb as 36 and 38 by means of flexible tubing 40 and 42 so that liquid from the respective bulb 36 or 38 may be run into the cell unit or drained out at will. The openings 30 and 32 may lead to vacuum and overflow respectively, the former being convenient to employ for exhausting air from the cells and their contents so that saturating liquid will enter the sample capillaries, and the overflow being convenient for circulating fluid through the cell unit if such becomes necessary.

The electrical resistance of either of the cells 1 or 2 when filled may be measured by connecting terminals 14 and 16, or 16 and 18, respectively, to an A.-C. conductivity bridge of known type, not shown or further described here. For making accurate measurements the electrodes 8, 10 and 12 are preferably of platinum or platinum-plated and platinized as is customary in making electrolytic-conductivity measurements.

A procedure which may be followed in making a measurement of the formation factor of a sample of porous medium is as follows. While for purposes of illustration the method of my invention will be described as applied to rock samples, it is not limited to measurements on such material. Similarly, in the illustration a brine is used as the saturating liquid but other electrically-conducting liquids may be employed.

The sample or fragments of rock to be studied should be free of contamination by foreign material, and for this purpose should be extracted to remove any residual oil or foreign salts. If irregular rock fragments from a core barrel or drill cuttings are used they should be washed to remove surface contaminations and mud.

The samples are then to be saturated with an electrically-conducting solution, e. g., brine. This may be done by inserting the dry fragments 50 into the lower cell 1 and assembling the cell unit as shown. The fragments should substantially fill the lower cell and should be packed in so that they are not easily dislodged or disarranged. The valves 26, 28 and 32 are then closed and the cells and contents evacuated through valve 30. When the cell and contained porous samples are exhausted of air, the valve 30 is closed, and the valve 26 leading to the leveling bulb 36 containing the brine is opened and both cells filled with the liquid which will also enter the capillaries of the porous samples and saturate them.

The upper cell 2 is then connected to a resistance-measuring bridge by means of terminals 16 and 18 and the resistance of the cell filled with liquid (denoted by C) is measured. The lower cell 1 is then in turn connected to the resistance-measuring bridge by means of terminals 16 and 14 and the resistance of the cell filled with the saturated porous medium and liquid (denoted by A) is measured. The overflow valve 32 is then opened and the liquid drained from the cells by lowering the leveling bulb 36. The sample is not disturbed in this process. The valve 26 is then closed.

The valve 28 opening to another liquid contained in the other leveling bulb 38 is then opened. This leveling bulb may contain a prepared suspension or emulsion whose continuous phase is the same as the liquid previously used above. However, in order that it should have a markedly different resistance, the suspended or dispersed phase may be a material which substantially alters the over-all electrical resistivity of the liquid. Thus for example, it may be a mud having suspended therein clay or other particles which have a high intrinsic resistance and thereby markedly raise the over-all resistivity value of the liquid. Alternatively, the liquid may comprise an oil-in-water type of emulsion carrying dispersed oil globules which markedly raise the over-all resistivity value of the liquid. Either of the above-described liquids are satisfactory for use in my invention.

Alternatively, a mud or suspension may be used which has a lower resistivity than the saturating liquid. Thus, for example, bentonite or other solids which tend to dissociate in water may be suspended in a high-resistivity solution, thus lowering its over-all resistivity. Powdered metal particles may also be used as the suspended phase of the liquid with similar results.

Inasmuch as the sample is already saturated with the liquid which comprises the continuous liquid phase of the above-described dispersions, there will be no diffusion into or out of the sample capillaries when surrounded by the dispersion. Thus, upon making a resistance measurement with the dispersion surrounding the sample there will be no change in the resistance of the rock sample. However, due to the increased resistance of the surrounding liquid a different cell resistance will be measured and the new value may differ substantially from the former measurement.

Upon opening the stopcock 28 connecting the cell unit to the leveling bulb 38 containing the second liquid, the bulb 38 is raised and the cells filled with the dispersion. The samples are not disturbed in this process. The resistance of the upper cell filled with the dispersion (denoted by D) is then measured, and the resistance of the lower cell filled with saturated sample surrounded by the dispersion in the voids (denoted by B) is also measured. The apparatus may then be dismantled, washed and dried preparatory for reuse.

The measured quantities are therefore the following:

A = resistance of the cell with brine-saturated sample surrounded by brine.
B = resistance of the cell with brine-saturated sample surrounded by suspension.
C = resistance of the cell full of brine only.
D = resistance of the cell full of suspension only.

The unknown quantities are the following:

$r$ = resistance of the brine-saturated sample.
$b$ = resistance of the brine surrounding the sample.
$m$ = resistance of the suspension surrounding the sample.
$s$ = resistance of brine having the same size and shape as the sample.
$F$ = formation factor of the sample which is to be determined.

The following mathematical relationships will hold between the measured, and therefore known, quantities and the unknown quantities:

$$\frac{1}{A} = \frac{1}{r} + \frac{1}{b}$$ Eq. 1 since in measuring the resistance A, the resistances $r$ and $b$ are in parallel.

$$\frac{1}{B}=\frac{1}{r}+\frac{1}{m} \qquad \text{Eq. 2}$$

since in measuring the resistance B, the resistances $r$ and $m$ are in parallel.

$$\frac{b}{m}=\frac{C}{D} \qquad \text{Eq. 3}$$

since the geometry is the same when the measurements are made with the brine and with the suspension.

$$\frac{1}{C}=\frac{1}{s}+\frac{1}{b} \qquad \text{Eq. 4}$$

since in measuring the resistance C, the resistances $s$ and $b$ are in parallel.

$$F=\frac{r}{s} \qquad \text{Eq. 5}$$

since the formation factor is defined as the resistance of a saturated rock to the resistance of a quantity of saturating liquid having the same size and shape as the sample.

These equations may be solved as simultaneous algebraic equations to obtain an expression for F in terms of the known quantities A, B, C and D with the following result:

$$F=\frac{AB(C-D)+CD(B-A)}{C(BC-AD)} \qquad \text{Eq. 6}$$

Inasmuch as A, B, C and D have been measured in performing the method of my invention, the formation factor F of the rock samples may be calculated by substituting the observed values in Eq. 6.

The values of B and D may be adjusted by changing the nature of the dispersed phase of the second liquid (dispersion) so as to attain the desired accuracy in the computed value of F. Whether to raise or lower the resistance of this liquid for improved accuracy becomes immediately apparent when the computation of Eq. 6 is carried out for one value of dispersion resistance.

The formation factor computed from the above measurements is thus obtained without going to the trouble and expense of coring the formation.

While I have described and illustrated my invention as applied to determining the formation factor of rock formations encountered in the drilling of a borehole, my invention may be used to determine such a characteristic of any porous medium, samples of which are available. Furthermore, while I have illustrated my invention as used in measuring samples available in fragmentary form, my invention is equally applicable to large sample pieces either regular or irregular in shape and upon which the measurements are made singly or in small or large numbers.

In the appended claims the term dispersion is defined to include either a so-called mud whose dispersed phase is a solid either electrically-conducting or non-conducting, or a so-called emulsion whose dispersed phase is a liquid. In addition it is contemplated that the liquids used in my invention need not necessarily be aqueous liquids, but may comprise other liquids having known electrical conducting or insulating properties.

Having measured the formation factor for the various rock formations penetrated by a drill, the values may be tabulated or plotted as a log against depth. This information may then be used in making computations on various individual formations in order to interpret the logs in a manner required in the petroleum exploration art.

What I claim as my invention is:

1. A method of determining a characteristic of a porous medium which comprises obtaining a sample of said medium, saturating said sample with an electrically-conducting liquid, preparing a dispersion whose continuous phase is of the same composition as said liquid and having a dispersed phase of higher electrical resistivity than said liquid, measuring the electrical resistance of an electrolytic cell filled with said liquid, measuring the electrical resistance of said electrolytic cell filled with said saturated sample surrounded by said liquid, measuring the electrical resistance of said electrolytic cell filled with said dispersion, and measuring the electrical resistance of said electrolytic cell filled with said saturated sample surrounded by said dispersion, whereby a characteristic of said sample may be computed from said measured resistances.

2. A method of determining a characteristic of a porous medium which comprises obtaining a sample of said medium, saturating said sample with an electrically-conducting liquid, preparing a dispersion whose continuous phase is of the same composition as said liquid and having a dispersed phase of lower electrical resistivity than said liquid, measuring the electrical resistance of an electrolytic cell filled with said liquid, measuring the electrical resistance of said electrolytic cell filled with said saturated sample surrounded by said liquid, measuring the electrical resistance of said electrolytic cell filled with said dispersion, and measuring the electrical resistance of said electrolytic cell filled with said saturated sample surrounding by said dispersion, whereby a characteristic of said sample may be computed from said measured resistances.

3. A method of determining a characteristic of a porous medium which comprises obtaining a sample of said medium, saturating said sample with an electrically-conducting liquid, preparing a dispersion whose continuous phase is of the same composition as said liquid and having a dispersed phase of different electrical resistivity than said liquid, measuring the electrical resistance of an electrolytic cell filled with said liquid, measuring the electrical resistance of said electrolytic cell filled with said dispersion, introducing into said electrolytic cell said saturated sample, measuring the electrical resistance of said electrolytic cell containing said saturated sample surrounded by said liquid, withdrawing said liquid from said cell and introducing said dispersion into said cell so as to surround said sample, and measuring the electrical resistance of said electrolytic cell containing said saturated sample surrounded by said dispersion, whereby a characteristic of said sample may be computed from said measured resistances.

4. A method of determining a characteristic of a rock formation encountered in drilling a borehole which comprises collecting rock cuttings arising in drilling the formation, saturating said cuttings with an electrically-conducting liquid, preparing a dispersion whose continuous phase is of the same composition as said liquid and having a dispersed phase of higher electrical resistivity than said liquid, measuring the electrical resistance of an electrolytic cell filled with said liquid, measuring the electrical resistance of said electrolytic cell filled with said saturated cuttings surrounded by said liquid, measuring the electrical resistance of said electrolytic cell filled with said dispersion, and measuring the electrical resistance of said electrolytic cell filled with said saturated cuttings surrounded by said dispersion, whereby a characteristic of the rock formation may be computed from said measured resistances.

5. A method of determining a characteristic of a rock formation encountered in drilling a borehole which comprises collecting rock cuttings arising in drilling the formation, saturating said cuttings with an electrically-conducting liquid, preparing a dispersion whose continuous phase is of the same composition as said liquid and having a dispersed phase of lower electrical resistivity than said liquid, measuring the electrical resistance of an electrolytic cell filled with said liquid measuring the electrical resistance of said electrolytic cell filled with said saturated cuttings surrounded by said liquid, measuring the electrical resistance of said electrolytic cell filled with said dispersion, and measuring the electrical resistance of said electrolytic cell filled with said saturated cuttings surrounded by said dispersion, whereby a characteristic of the rock formation may be computed from said measured resistances.

6. A method of determining a characteristic of a rock formation encountered in drilling a borehole which comprises collecting rock cuttings arising in drilling the formation, saturating said cuttings with an electrically-conducting liquid, preparing a dispersion whose continuous phase is of the same composition as said liquid and having a dispersed phase of different electrical resistivity than said liquid, measuring the electrical resistance of an electrolytic cell filled with said liquid, measuring the electrical resistance of said electrolytic cell filled with said dispersion, introducing into said electrolytic cell said saturated cuttings, measuring the electrical resistance of said electrolytic cell containing said saturated cuttings surrounded by said liquid, withdrawing said liquid from said cell and introducing said dispersion into said cell so as to surround said cuttings, and measuring the electrical resistance of said electrolytic cell containing said saturated cuttings surrounded by said dispersion, whereby a characteristic of the rock formation may be computed from said measuring resistances.

HOMER W. PATNODE.

REFERENCES CITED

The following references are of record in the file of this patent:

UNITED STATES PATENTS

| Number | Name | Date |
| --- | --- | --- |
| 1,145,509 | Pike et al. | July 6, 1915 |
| 1,701,331 | Merrill | Feb. 5, 1929 |
| 1,840,635 | Parker | Jan. 12, 1932 |

FOREIGN PATENTS

| Number | Country | Date |
| --- | --- | --- |
| 302,498 | Great Britain | Dec. 20, 1928 |